United States Patent
Dai et al.

(10) Patent No.: US 9,066,307 B2
(45) Date of Patent: Jun. 23, 2015

(54) METHOD AND DEVICE FOR TRANSMITTING UPLINK TRANSMISSION POWER CONTROL INFORMATION

(75) Inventors: Bo Dai, Shenzhen (TW); Xin Wu, Shenzhen (TW); Ping Zeng, Shenzhen (TW); Zhisong Zuo, Shenzhen (TW)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 65 days.

(21) Appl. No.: 13/513,127

(22) PCT Filed: Jun. 30, 2010

(86) PCT No.: PCT/CN2010/074860
§ 371 (c)(1),
(2), (4) Date: May 31, 2012

(87) PCT Pub. No.: WO2010/149109
PCT Pub. Date: Dec. 29, 2010

(65) Prior Publication Data

US 2012/0236799 A1      Sep. 20, 2012

(30) Foreign Application Priority Data

Jan. 8, 2010   (CN) .......................... 2010 1 0002228

(51) Int. Cl.
| H04W 52/58 | (2009.01) |
| H04W 52/18 | (2009.01) |
| H04W 72/04 | (2009.01) |
| H04W 52/54 | (2009.01) |
| H04W 52/42 | (2009.01) |
| H04W 52/14 | (2009.01) |
| H04W 52/34 | (2009.01) |

(Continued)

(52) U.S. Cl.
CPC ............ *H04W 52/54* (2013.01); *H04W 52/146* (2013.01); *H04W 52/42* (2013.01); *H04W 52/34* (2013.01)

(58) Field of Classification Search
USPC ......... 370/229, 235, 226, 310, 311, 351, 389, 370/392, 431, 433, 437, 464, 465; 455/403, 455/422.1, 39, 500, 507, 517, 522, 91, 455/127.1
See application file for complete search history.

(56) References Cited

U.S. PATENT DOCUMENTS

2004/0092235 A1 * 5/2004 Li et al. .................. 455/101

(Continued)

FOREIGN PATENT DOCUMENTS

| CN | 101141156 A | 3/2008 |
| CN | 101610564 A | 12/2009 |

OTHER PUBLICATIONS

Huawei, "TPC for PUSCH and PUCCH on format 3/3A", Aug. 18-22, 2008, TSG-RAN WG1 #54, R1-083043, pp. 1-3.*

(Continued)

*Primary Examiner* — Omar Ghowrwal
(74) *Attorney, Agent, or Firm* — McClure, Qualey & Rodack, LLP

(57) ABSTRACT

A method and an apparatus for transmitting uplink transmission power control information are disclosed. The method includes: transmitting uplink transmission power control information of all uplink component carriers allocated to a user equipment (UE) to the UE by one downlink component carrier. By adopting the above technical scheme, it is implemented that the uplink transmission power control information is transmitted in a carrier aggregation system.

9 Claims, 2 Drawing Sheets

(56) References Cited

U.S. PATENT DOCUMENTS

| | | | |
|---|---|---|---|
| 2010/0279628 A1* | 11/2010 | Love et al. | 455/70 |
| 2011/0081939 A1* | 4/2011 | Damnjanovic et al. | 455/522 |
| 2012/0269287 A1* | 10/2012 | Papasakellariou | 375/295 |
| 2014/0161067 A1* | 6/2014 | Lee et al. | 370/329 |

OTHER PUBLICATIONS http://dictionary.reference.com/browse/single, "single", dictionary.com, retrieved Aug. 7, 2014, pp. 1.*

International Search Report for PCT/CN2010/074860.

* cited by examiner

METHOD AND DEVICE FOR TRANSMITTING UPLINK TRANSMISSION POWER CONTROL INFORMATION

CROSS REFERENCE RELATED APPLICATIONS

This application is a national phase of PCT/CN2010/074860 filed Jun. 30, 2010, which claims priority to China Application Serial No. 201010002228.6, filed Jan. 8, 2010, both of which are entirely incorporated herein by reference.

TECHNICAL FIELD

The present invention relates to the communication field, and particularly, to a method and an apparatus for transmitting uplink transmission power control information.

BACKGROUND OF THE RELATED ART

A radio frame in a Long Term Evolution (LTE) system includes frame structures of a Frequency Division Duplex (FDD) mode and a Time Division Duplex (TDD) mode. The frame structure of FDD mode is shown in FIG. 1, one radio frame of 10 ms is composed of 20 slots with numbers 0~19 and the length of each slot being 0.5 ms, and a subframe i of 1 ms is composed of slots $2i$ and $2i+1$. The frame structure of TDD mode is shown in FIG. 2, one radio frame of 10 ms is composed of two half frames each of which has a length of 5 ms, one half frame includes 5 subframes each of which has a length of 1 ms, and subframe i is defined as two slots $2i$ and $2i+1$ each of which has a length of 0.5 ms. In the above two frame structures, for a Normal CP (Normal Cyclic Prefix), one slot includes 7 symbols each of which has a length of 66.7 us, wherein a CP length of the first symbol is 5.21 us and the length of each of the other 6 symbols is 4.69 us; for an Extended CP (Extended Cyclic Prefix), one slot includes 6 symbols, the length of each of the 6 symbols is 16.67 us.

The version number of the LTE corresponds to R8 (Release 8), and the version number to which an additional version of the LTE corresponds is R9 (Release 9); while, for the future LTE-Advance, its version number is R10 (Release 10). The following three downlink physical control channel are defined in the LTE: a Physical Control Format Indicator Channel (PCFICH), a Physical Hybrid Automatic retransmission Request Indicator Channel (PHICH) and a Physical Downlink Control Channel (PDCCH).

Wherein, the information carried in the PCFICH is used to indicate the number of Orthogonal Frequency Division Multiplexing (OFDM) symbols of the PDCCH transmitted in one subframe, the OFDM symbols of the PDCCH are transmitted in the first OFDM symbol of the subframe, and the frequency position is determined by a system downlink bandwidth and a cell Identity (ID).

The PHICH is used to bear acknowledgement/negative-acknowledgement (ACK/NACK) feedback information of the uplink transmission data. The number of the PHICHs and time-frequency position can be determined by a system message and a cell ID in a Physical Broadcast Channel (PBCH) of a downlink carrier at which the PHICH located.

The PDCCH is used to bear Downlink Control Information (DCI) which includes: uplink/downlink scheduling information, and uplink power control information. The DCI format are classified as follows: DCI format 0, DCI format 1, DCI format 1A, DCI format 1B, DCI format 1C, DCI format 1D, DCI format 2, DCI format 2A, DCI formats 3 and DCI format 3A, and so on; wherein:

DCI format 0 is used to indicate the scheduling of a Physical Uplink Shared Channel (PUSCH);

DCI format 1, DCI format 1A, DCI format 1B, DCI format 1C and DCI format 1D are used to different modes of a PDSCH codeword scheduling;

DCI format 2, DCI format 2A and DCI format 2B are used to different modes of space division multiplexing;

DCI formats 3 and DCI format 3A are used to different modes of power control instructions of the Physical Uplink Control Channel (PUCCH) and the PUSCH.

The sizes of DCI formats 3 and 3A are identical with the size of DCI format 0. In the DCI format 3, two consecutive bits are used to indicate Transmit Power Control (TPC) commands of the PUCCH and the PUSCH, and a high layer signaling tpc-Index designates an initial position of the TPC command of a user; while, in the DCI format 3A, 1 bit is used to indicate TPC commands of the PUCCH and the PUSCH, and a high layer signaling tpc-Index designates an initial position of the TPC command of a user.

Specifically, the DCI format 3 uses 2 bits to transmit the TPC commands for the PUCCH and the PUSCH, and the following information is indicated by the DCI format 3:

TPC command 1, TPC command 2, ..., TPC command N

Wherein, $$N = \left\lfloor \frac{L_{format\,0}}{2} \right\rfloor,$$

$L_{format\,0}$ is equal to the size of the DCI format 0 before a Cyclical redundancy check (CRC) is added, which includes any additional bit. The parameter tpc-Index given by the high layer signaling is used to designate an index of the TPC command of a user.

If $$\left\lfloor \frac{L_{format\,0}}{2} \right\rfloor < \frac{L_{format\,0}}{2},$$

one bit 0 will be added into the DCI format 3.

Specifically, the DCI format 3A uses 1 bit to transmit the TPC commands for the PUCCH and the PUSCH, and the following information is indicated by the DCI format 3A:

TPC command 1, TPC command 2, ..., TPC command M

Wherein, $M = L_{format\,0}$, and $L_{format\,0}$ is equal to the size of the DCI format 0 before a CRC is added, which includes any additional bit. The parameter tpc-Index given by the high layer signaling is used to designate an index of the TPC command of a user.

Because a LTE-Advanced network needs to be able to access LTE users, the operation frequency band of the LTE-Advanced network needs to cover the present LTE frequency band. However, on that frequency range, there have been no allocated consecutive frequency spectrum bandwidth of 100 MHz, so a direct technology which the LTE-Advanced needs to solve is to aggregate several consecutive component carriers (frequency spectrum) allocated on different frequency bands together by adopting a Carrier Aggregation technology, to form the band width of 100 MHz that the LTE-Advanced can uses. With regard to the aggregated frequency spectrum, it is divided into n component carriers (frequency spectrum), and the frequency spectrum in each component carrier (frequency spectrum) is consecutive.

In the 57$^{th}$ bis conference of the 3GPP, setting a user equipment downlink component carrier set (UE DL Component Carrier Set) and a user equipment uplink component carrier set (UE UL Component Carrier Set) are passed. The UE DL Component Carrier Set includes some component carriers, and the user needs to receive the PDSCH on these component carriers in the downlink; and the UE UL Component Carrier Set includes some component carriers, and the user needs to receive the PUSCH on these component carriers in the uplink.

In the LTE-Advanced system, the adoption of the carrier aggregation makes a downlink component carrier may correspond to multiple uplink component carriers, which is different from the case that only one downlink carrier corresponds to one uplink carrier in the LTE system. At the moment, a method for transmitting a uplink transmission power control command also exists some differences. At the present stage, there is no clear scheme and definition on the method for transmitting the uplink transmission power control command in the LTE-Advanced system, thereby bringing inconvenience to the practical application.

SUMMARY OF THE INVENTION

The present invention provides a method and an apparatus for transmitting uplink transmission power control information, to transmit the uplink transmission power control information in a carrier aggregation system.

In order to achieve the above object of the present invention, the present invention provides the following technical schemes.

A method for transmitting uplink transmission power control information comprises:

transmitting uplink transmission power control information of all uplink component carriers allocated to a user equipment (UE) to the UE by one downlink component carrier.

Preferably, the method also has the following characteristic:

the downlink component carrier has a corresponding relation with at least one uplink component carrier in all the uplink component carriers.

Preferably, the method also has the following characteristic:

the downlink component carrier has the corresponding relation with an uplink component carrier which transmits uplink control information of the UE.

Preferably, the method also has the following characteristic:

the step of transmitting the uplink transmission power control information of all the uplink component carriers allocated to the UE to the UE by one downlink component carrier comprises:

carrying the uplink transmission power control information of all the uplink component carriers in a consecutive domain of a downlink control information format 3/3A, and notifying, by a base station, initial position information of the uplink power control information in the downlink control information format 3/3A to the UE by a signaling.

Preferably, the method also has the following characteristic:

if the uplink transmission power control information is transmitted by adopting the DCI format 3, in an information domain of the DCI format 3, the uplink transmission power control information of each uplink component carrier is carried by using 2 bits, and an initial position of each uplink transmission power control information is marked in a high layer signaling (tpc-Index) and the initial position is an even number;

if the uplink transmission power control information is transmitted by adopting the DCI format 3A, in an information domain of the DCI format 3A, the uplink transmission power control information of each uplink component carrier is carried by using 1 bit, and an initial position of each uplink transmission power control information is marked in the tpc-Index.

Preferably, the method also has the following characteristic:

the power control information of the uplink component carrier is power control information of a Physical Uplink Shared Channel (PUSCH) or a Physical Uplink Control Channel (PUCCH) of the UE on the uplink component carrier.

Preferably, the method also has the following characteristic:

when Cyclical redundancy check (CRC) bits of the DCI format 3/3A are scrambled by TPC-PUCCH-RNTI, information carried by the DCI format 3/3A is a TPC command of the PUCCH;

when CRC bits of the DCI format 3/3A are scrambled by TPC-PUSCH-RNTI, information carried by the DCI format 3/3A is a TPC command of the PUSCH.

Preferably, the method also has the following characteristic:

when the UE transmits data of more than one physical uplink control channel on the uplink component carrier, all the physical uplink control channels on that uplink component carrier adopt the same uplink transmission power control information to perform a power control, wherein the uplink transmission power control information is transmitted in the downlink control information format 3/3A.

Preferably, the method also has the following characteristic:

the UE adopts the same power control information to perform a power control in the more than one physical uplink shared channel of the uplink component carrier; and carries the power control information in the downlink control information format 3/3A to transmit, and carries one power control information in the downlink control information format 3/3A.

An apparatus for transmitting uplink transmission power control information, which is configured to: transmit uplink transmission power control information of all uplink component carriers allocated to a user equipment (UE) to the UE by one downlink component carrier.

Preferably, the apparatus also has the following characteristic:

the downlink component carrier has a corresponding relation with at least one uplink component carrier in all the uplink component carriers.

Preferably, the apparatus also has the following characteristic:

the downlink component carrier has the corresponding relation with an uplink component carrier which transmits uplink control information of the UE.

Preferably, the apparatus is configured to:

carry the uplink transmission power control information of all the uplink component carriers in a consecutive domain of a downlink control information format 3/3A, and notify the UE of initial position information of the uplink power control information in the downlink control information format 3/3A by a signaling.

Preferably, the apparatus is configured to: if the uplink transmission power control information is transmitted by adopting the DCI format 3, in an information domain of the DCI format 3, carry the uplink transmission power control information of each uplink component carrier by using 2 bits, and mark an initial position of each uplink transmission power control information in a high layer signaling (tpc-Index), wherein the initial position is an even number;

if the uplink transmission power control information is transmitted by adopting the DCI format 3A, in an information domain of the DCI format 3A, carry the uplink transmission power control information of each uplink component carrier by using 1 bit, and mark an initial position of each uplink transmission power control information in a tpc-Index.

Preferably, the apparatus also has the following characteristic:

the power control information of the uplink component carrier is power control information of a physical uplink shared channel or a physical uplink control channel of the target UE on the uplink component carrier.

Preferably, the apparatus also has the following characteristic:

when Cyclical redundancy check (CRC) bits of the DCI format 3/3A are scrambled by TPC-PUCCH-RNTI, information carried by the DCI format 3/3A is a TPC command of the PUCCH;

when CRC bits of the DCI format 3/3A are scrambled by TPC-PUSCH-RNTI, information carried by the DCI format 3/3A is a TPC command of the PUSCH.

Preferably, the apparatus is also configured to: when the UE transmits data of more than one physical uplink control channel on the uplink component carrier, adopt the same uplink transmission power control information to perform a power control by all the physical uplink control channels on that uplink component carrier, wherein the uplink transmission power control information is carried in the downlink control information format 3/3A to be transmitted.

Preferably, the apparatus is also configured to: when the UE adopts the same power control information to perform a power control in more than one physical uplink shared channel of the uplink component carrier, carry the power control information in the downlink control information format 3/3A to transmit, and carry one power control information in the downlink control information format 3/3A.

According to the technical schemes provided by the present invention, the uplink transmission power control information of at least one uplink component carrier is transmitted to the UE by one downlink component carrier, to implement transmitting the uplink transmission power control information in the carrier aggregation system.

PREFERRED EMBODIMENTS OF THE PRESENT INVENTION

The technical scheme provided by the present invention will be further described in combination with accompanying drawings as follows.

In the scenario of the carrier aggregation, there will be a case that multiple downlink component carriers correspond to multiple uplink component carriers, and then uplink transmission power control commands of the multiple uplink component carriers can be transmitted in one downlink component carrier, and can be transmitted by a DCI formats 3 and a DCI format 3A.

In a R8, the sizes of the DCI formats 3 and 3A is identical with the size of a DCI format 0. wherein, in the DCI format 3, two consecutive bits are used to indicate Transmit Power Control (TPC) commands of the PUCCH and the PUSCH, and a high layer signaling tpc-Index designates an initial position of the TPC command of a user; and, in the DCI format 3A, 1 bit is used to indicate the Transmit Power Control (TPC) commands of the PUCCH and the PUSCH, and a high layer signaling tpc-Index designates an initial position of the TPC command of a user.

Mode 1

In the scenario of carrier aggregation, there will be a case that multiple downlink component carriers correspond to multiple uplink component carriers, and the uplink transmission power control commands of all the uplink component carriers allocated to the UE can be transmitted in one downlink component carrier, wherein, at least one uplink component carrier has a corresponding relation with the downlink component carrier, and the corresponding relation can be pre-configured by the network side.

Further, the uplink component carrier which has the corresponding relation can be an uplink component carrier transmitting the uplink control information.

Wherein, the uplink component carrier of the uplink control information is the uplink component carrier for transmitting feedback information such as ACK/NACK, etc.

Figure 1:
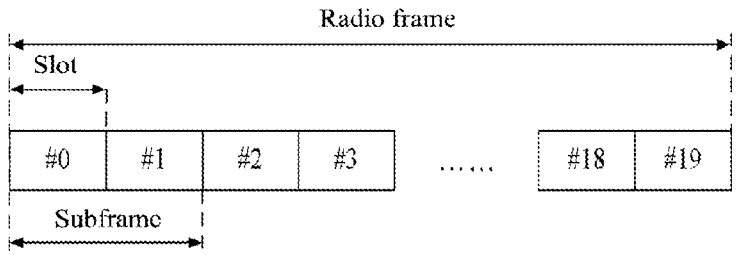
FIG. 1 is a schematic diagram of a frame structure of an FDD mode in the related art.
Figure 2:
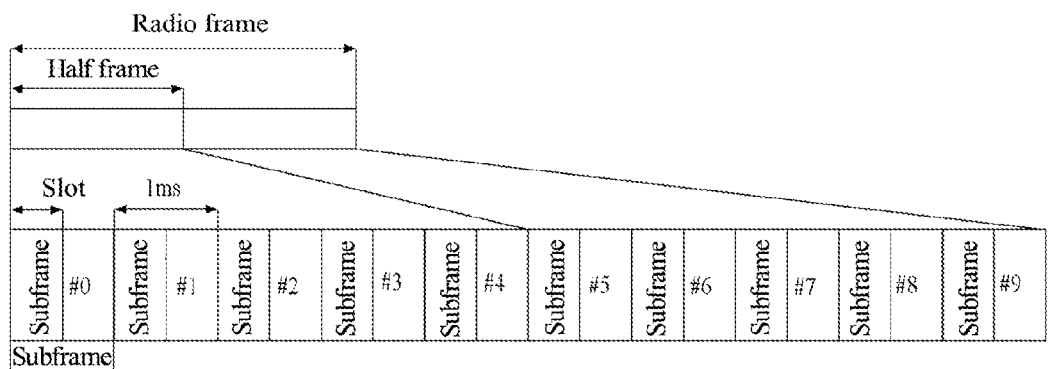
FIG. 2 is a schematic diagram of a frame structure of a TDD mode in the related art.
Figure 3:
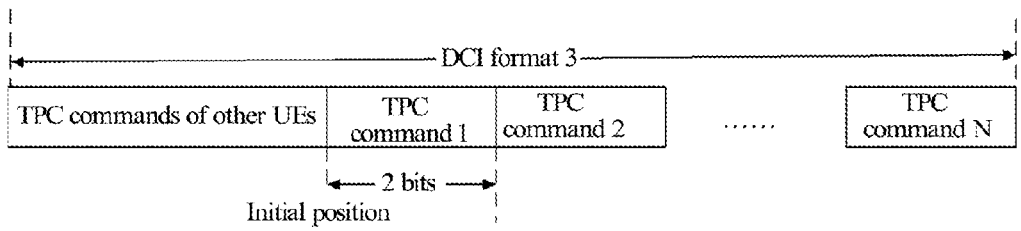
FIG. 3 is a structure diagram of a DCI format 3 of transmitting uplink transmission power control information by adopting the DCI format 3 provided by the present invention.
Figure 4:
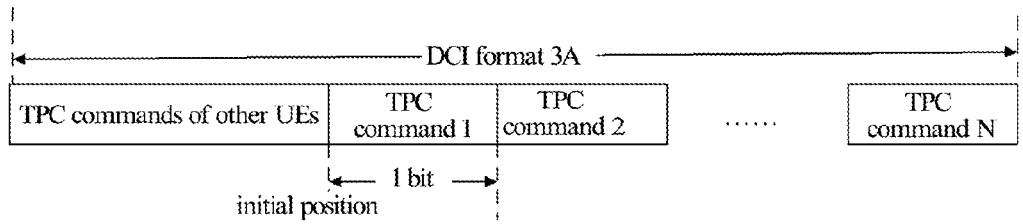
FIG. 4 is a structure diagram of a DCI format 3A of transmitting uplink transmission power control information by adopting the DCI format 3A provided by the present invention.

Assuming that the uplink transmission power control commands of K uplink component carriers can be transmitted in one downlink component carrier, and then it is needed in the DCI format 3 that, the transmit power control commands of the PUCCH and PUSCH in the K uplink component carriers is indicated by 2K bits, while in the DCI format 3A, the transmit power control commands of the PUCCH and PUSCH in the K uplink component carriers is indicated by K bits. In the same way, as shown in FIG. 3, in the DCI format 3, a high layer signaling tpc-Index designates the initial position of the TPC command of a user, and the initial position is an even number, and then according to an order, the first 2 bits are used to indicate the TPC command of the first uplink component carrier, the second 2 bits are used to indicate the TPC command of the second uplink component carrier, until the $K^{th}$ 2 bits are used to indicate the TPC command of the $K^{th}$ uplink component carrier; as shown in FIG. 4 in the DCI format 3A, a high layer signaling tpc-Index designates the initial position of the TPC command of a user, and then according to an order, the first bit is used to indicate the TPC command of the first uplink component carrier, the second bit is used to indicate the TPC command of the second uplink component carrier, until the $K^{th}$ bit is used to indicate the TPC command of the $K^{th}$ uplink component carrier.

Mode 2

When the UE has more than one physical uplink control channel on the uplink component carrier to send, all the physical uplink control channels on the uplink component carrier adopt the same power control information to perform a power control, and the power control information is transmitted in the downlink control information format 3/3A.

Mode 3

When the UE adopts the same power control information to perform the power control in the physical uplink shared channels on different uplink component carrier, the power control information is transmitted in the downlink control information format 3/3A; wherein, one power control information is transmitted in the downlink control information format 3/3A.

Therefore, in a scenario of the carrier aggregation of R10, information domains of the DCI formats 3 and 3A will be described as follows:

DCI format 3 uses 2K bits to transmit the TPC commands for the PUCCH and the PUSCH;

DCI format 3A uses K bits to transmit the TPC commands for the PUCCH and the PUSCH.

Wherein, when Cyclical redundancy check (called as CRC for short) bits of the DCI format 3/3A are scrambled by TPC-PUCCH-RNTI, the information carried by the DCI format 3/3A is the TPC commands of the PUCCH, and when the CRC bits of the DCI format 3/3A are scrambled by TPC-PUSCH-RNTI, the information carried by the DCI format 3/3A is the TPC command of the PUSCH, wherein, RNTI is a Radio Network Temporary Identifier.

Figure 5:
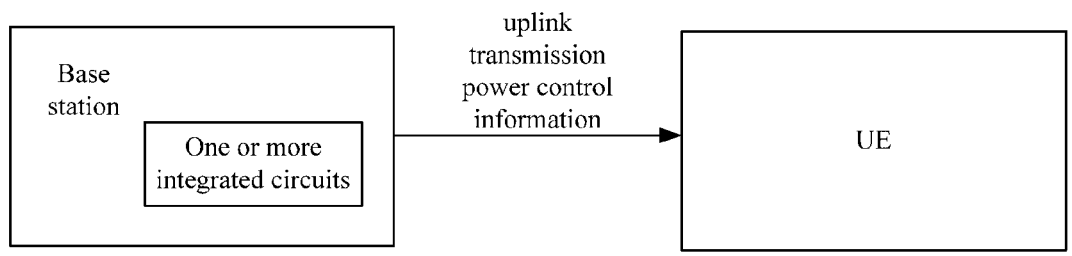
FIG. 5 illustrates apparatus and data transmissions of an embodiment of the present invention.

As shown in FIG. 5, an apparatus of an embodiment of the present invention comprises one or more integrated circuits, and the apparatus is configured to: transmit the uplink transmission power control information of all uplink component carriers allocated to the UE to the UE by one downlink component carrier.

Preferably, the downlink component carrier has a corresponding relation with at least one uplink component carrier in all the uplink component carriers.

Preferably, the downlink component carrier has a corresponding relation with the uplink component carrier for transmitting the uplink control information of the UE.

Preferably, the apparatus is configured to: carry the uplink transmission power control information of all the uplink component carriers in a consecutive domain of the downlink control information format 3, and notify the initial position information of the uplink power control information in the downlink control information format 3 to the UE by a signaling; or carry the uplink transmission power control information of all the uplink component carriers in a consecutive domain of the downlink control information format 3A, and notify the initial position information of the uplink power control information in the downlink control information format 3A is transmitted to the UE by a signaling.

Preferably, the apparatus is configured to:

when the uplink transmission power control information is transmitted by adopting the downlink control information format 3, in an information domain of the downlink control information format 3, carry the uplink transmission power control information of each uplink component carrier by using 2 bits, and mark an initial position of each uplink transmission power control information in a high layer signaling, wherein the initial position is an even number;

when the uplink transmission power control information is transmitted by adopting the downlink control information format 3A, in an information domain of the downlink control information format 3A, carry the uplink transmission power control information of each uplink component carrier by using 1 bit, and mark an initial position of each uplink transmission power control information in a high layer signaling.

Preferably, the apparatus is also configured to: when the UE transmits data of more than one physical uplink control channel on the uplink component carrier, adopt the same uplink transmission power control information to perform a power control by all the physical uplink control channels on that uplink component carrier, wherein the uplink transmission power control information is carried in the downlink control information format 3 or the downlink control information format 3A to be transmitted.

Preferably, the apparatus is also configured to: when the UE adopts the same power control information to perform a power control in more than one physical uplink shared channel of the uplink component carrier, carry the power control information in the downlink control information format 3 to transmit, and carry one power control information in the downlink control information format 3; or carry the power control information in the downlink control information format 3A to transmit, and carry one power control information in the downlink control information format 3A.

In summary, regarding to a case that one downlink component carrier corresponds to multiple uplink component carriers in the scenario of the carrier aggregation in the version R10 of the LTE-Advanced, the present invention invents a method for transmitting uplink transmission power control commands of multiple uplink component carriers in one downlink component carrier, and the uplink transmission power control command is transmitted by the downlink control information formats 3 and 3A.

Those of ordinary skill in the art should understand that all of or part of steps in the above-mentioned method may be completed by a program instructing relevant hardware, and the program may be stored in a computer readable storage medium, such as a read only memory, a magnetic disk or an optical disk. Alternatively, all of or part of steps of the above-mentioned embodiments may also be implemented by using one or more integrated circuits. Correspondingly, each module/unit in the above-mentioned embodiments may be implemented in form of hardware, or may be implemented in form of software function module. The present invention is not limited to any specified form of the combination of hardware and software.

Although the present invention is described in combination with specific embodiments, however, for those skilled in the art, modifications and variations may be made without departing from the spirit or scope of the present invention. Such modifications and variations should be regarded as within the scope of the present invention and the appended claims.

INDUSTRIAL APPLICABILITY

The present invention provides a method and an apparatus for transmitting uplink transmission power control information, which implements transmitting the uplink transmission power control information in the case that one downlink component carrier corresponds to multiple uplink component carriers in the scenario of the carrier aggregation in the version R10 of the LTE-Advanced.

What is claimed is:

1. A method for transmitting uplink transmission power control information, comprising:

in a scenario of a carrier aggregation where multiple uplink component carriers and multiple downlink component carriers are aggregated, transmitting by one or more integrated circuits of a base station uplink transmission power control information of all the multiple uplink component carriers allocated to a user equipment (UE) on one specific downlink component carrier of the multiple downlink component carriers to the UE;

wherein the uplink transmission power control information is carried in a downlink control information format 3/3A, said one specific downlink component carrier corresponds to an uplink component carrier of the UE, said uplink component carrier transmits uplink control information of the UE;

when the uplink transmission power control information is transmitted by adopting the downlink control information format 3, in an information domain of the downlink control information format 3, the uplink transmission power control information of each uplink component carrier is carried by using 2 bits, and an initial position of each uplink transmission power control information is marked layer in a high layer signaling and the initial position is an even number;

when the uplink transmission power control information is transmitted by adopting the downlink control information format 3A, in an information domain of the downlink control information format 3A, the uplink transmission power control information of each uplink component carrier is carried b using 1 bit, and an initial position of each uplink transmission power control information is marked in a high layer signaling.

2. The method according to claim 1, further comprising:

carrying the uplink transmission power control information of all the multiple uplink component carriers in a consecutive domain of the downlink control information format 3, and notifying, by the one or more integrated circuits of the base station, initial position information of the uplink transmission power control information in the downlink control information format 3 to the UE by a signaling; or carrying the uplink transmission power control information of all the multiple uplink component carriers in a consecutive domain of the downlink control information format 3A, and notifying, by the one or more integrated circuits of the base station, initial position information of the uplink transmission power control information in the downlink control information format 3A to the UE by a signaling.

3. The method according to claim 1, wherein, the power control information of the uplink component carrier is power control information of a Physical Uplink Shared Channel (PUSCH) or a Physical Uplink Control Channel (PUCCH) of the UE on the uplink component carrier;

when Cyclical redundancy check (CRC) bits of the downlink control information format 3 are scrambled by TPC-PUCCH-RNTI, information carried by the downlink control information format 3 is a transmit power control command of the PUCCH;

when CRC bits of the downlink control information format 3A are scrambled by TPC-PUCCH-RNTI, information carried by the downlink control information format 3A is a transmit power control command of the PUCCH;

when CRC bits of the downlink control information format 3 are scrambled by TPC-PUSCH-RNTI, information carried by the downlink control information format 3 is a transmit power control command of the PUSCH;

when CRC bits of the downlink control information format 3A are scrambled by TPC-PUSCH-RNTI, information carried by the downlink control information format 3A is a transmit power control command of the PUSCH.

4. The method according to claim 1, further comprising:

when the UE transmits data of more than one physical uplink control channel on the uplink component carrier, all the physical uplink control channels on that uplink component carrier adopting the same uplink transmission power control information to perform a power control, wherein the uplink transmission power control information is carried in the downlink control information format 3 or the downlink control information format 3A to be transmitted.

5. The method according to claim 1, further comprises:

the UE adopting the same power control information to perform a power control in the more than one physical uplink shared channel of the uplink component carrier; and carrying the power control information in the downlink control information format 3 to send, and carrying one said power control information in the downlink control information format 3; or carrying the power control information in the downlink control information format 3A to send, and carrying one said power control information in the downlink control information format 3A.

6. A computer-readable memory device comprising a set of instructions stored therein which, when executed by a processor, causes the processor to:

in a scenario of a carrier aggregation where multiple uplink component carriers and multiple downlink component carriers are aggregated, transmit uplink transmission power control information of all the multiple uplink component carriers allocated to a user equipment (UE) on one specific downlink component carrier of the multiple downlink component carriers to the UE;

wherein the uplink transmission power control information is carried in a downlink control information format 3/3A, said one specific downlink component carrier corresponds to an uplink component carrier of the UE, said uplink component carrier transmits uplink control information of the UE;

when the uplink transmission power control information is transmitted by adopting the downlink control information format 3, in an information domain of the downlink control information format 3, carrying the uplink transmission power control information of each uplink component carrier by using 2 bits, and marking an initial position transmission power control information in a high layer signaling, wherein the initial position is an even number;

when the uplink transmission power control information is transmitted by adopting the downlink control information format 3A, in an information domain of the downlink control information format 3A, carrying the uplink transmission power control information of each uplink component carrier by using 1 bit, and marking an initial position of each uplink transmission power control information in a high layer signaling.

7. The computer-readable memory device of claim 6, further comprising:

carrying the uplink transmission power control information of all the multiple uplink component carriers in a consecutive domain of the downlink control information format 3, and notifying the UE of initial position information of the uplink power control information in the downlink control information format 3 by a signaling; or, carrying the uplink transmission power control information of all the multiple uplink component carriers in a consecutive domain of the downlink control information format 3A, and notifying the UE of initial position information of the uplink power control information in the downlink control information format 3A by a signaling.

8. The computer-readable memory device of claim 6, wherein further comprising:

when the UE transmits data of more than one physical uplink control channel on the uplink component carrier, adopting the same uplink transmission power control information to perform a power control by all the physical uplink control channels on that uplink component carrier, wherein the uplink transmission power control information is carried in the downlink control information format 3 or the downlink control information format 3A to be transmitted.

9. The computer-readable memory device of claim 6, wherein further comprising:

when the UE adopts the same power control information to perform a power control in more than one physical uplink shared channel of the uplink component carrier, carrying the power control information in the downlink control information format 3 to transmit, and carrying one said power control information in the downlink control information format 3; or carrying the power control information in the downlink control information format 3A to transmit, and carrying one said power control information in the downlink control information format 3A.

* * * * *